US012423506B2

(12) United States Patent
Sato

(10) Patent No.: US 12,423,506 B2
(45) Date of Patent: Sep. 23, 2025

(54) INFORMATION PROCESSING SYSTEM, INFORMATION PROCESSING METHOD AND COMPUTER READABLE MEDIUM

(71) Applicant: FUJIFILM Business Innovation Corp., Tokyo (JP)

(72) Inventor: Chihiro Sato, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 703 days.

(21) Appl. No.: 17/387,208

(22) Filed: Jul. 28, 2021

(65) Prior Publication Data

US 2022/0311898 A1 Sep. 29, 2022

(30) Foreign Application Priority Data

Mar. 26, 2021 (JP) .................................. 2021-053657

(51) Int. Cl.
*H04N 1/00* (2006.01)
*G06F 40/103* (2020.01)

(52) U.S. Cl.
CPC .................................. *G06F 40/103* (2020.01)

(58) Field of Classification Search
None
See application file for complete search history.

(56) References Cited

U.S. PATENT DOCUMENTS 9,965,235 B2 * 5/2018 Fujiwara ............... G06F 3/1215
10,282,690 B1 * 5/2019 DelFranco ......... G06Q 10/0633
10,853,130 B1 * 12/2020 Barrett .................. G06F 15/163
11,238,899 B1 * 2/2022 Miller ..................... G11B 27/28
2003/0135428 A1 * 7/2003 Smith ................ G06Q 30/0635
  705/26.81
2004/0177337 A1 * 9/2004 Iida ..................... H04N 1/32667
  717/104
2004/0190057 A1 * 9/2004 Takahashi ............. G06F 3/1205
  358/1.15
2005/0055583 A1 * 3/2005 Tanaka ................. G06Q 10/10
  726/19

(Continued)

FOREIGN PATENT DOCUMENTS

JP   2001-147964 A    5/2001
JP   2004-274150 A    9/2004
JP   2008-147947 A    6/2008

OTHER PUBLICATIONS

Feb. 23, 2022 Extended European Search Report issued in European Patent Application No. 21196312.9.

(Continued)

*Primary Examiner* — Hua Lu
(74) *Attorney, Agent, or Firm* — Oliff PLC

(57) ABSTRACT

An information processing system includes a processor, and the processor is configured to: acquire a feature of a target document that is a document as a processing target; acquire process information that is information on a process to be performed on the target document; acquire past information that is information on a process performed on a past document that has the feature of the target document and has been processed in the past; and decide a process to be performed on the target document based on the process information and the past information.

19 Claims, 14 Drawing Sheets

(56) References Cited

U.S. PATENT DOCUMENTS

| | | | |
|---|---|---|---|
| 2005/0144308 A1* | 6/2005 | Harashima | H04L 67/561 707/999.2 |
| 2007/0130188 A1* | 6/2007 | Moon | H04L 9/3236 |
| 2009/0327945 A1* | 12/2009 | Tomizawa | G06Q 10/06 718/102 |
| 2010/0095351 A1* | 4/2010 | Liu | H04L 63/1458 726/23 |
| 2010/0223671 A1* | 9/2010 | Tsuda | G06F 16/93 707/E17.022 |
| 2010/0231949 A1* | 9/2010 | Mori | G06Q 50/184 358/1.14 |
| 2010/0235218 A1* | 9/2010 | Erhart | G06Q 10/06 705/345 |
| 2011/0004614 A1* | 1/2011 | Chow | G06F 16/93 707/769 |
| 2011/0119189 A1* | 5/2011 | Clayton | G06Q 20/40 705/44 |
| 2012/0069363 A1* | 3/2012 | Nohdomi | H04N 1/32771 358/1.9 |
| 2013/0317879 A1* | 11/2013 | Ukai | G06Q 10/0633 705/7.27 |
| 2014/0297698 A1* | 10/2014 | Tanimoto | G06F 16/1865 707/826 |
| 2015/0222731 A1* | 8/2015 | Shinohara | H04L 67/01 709/203 |
| 2016/0253128 A1* | 9/2016 | Mori | G06F 3/1298 358/1.15 |
| 2017/0094119 A1* | 3/2017 | Fukasawa | H04N 1/4413 |
| 2020/0210232 A1* | 7/2020 | Kumazawa | G06F 9/5011 |
| 2020/0341617 A1* | 10/2020 | Xiong | G06F 9/44 |
| 2022/0027417 A1* | 1/2022 | Katz | G06F 16/90335 |

OTHER PUBLICATIONS

Derose, Zack "Computation Caching: The Fundamentals Behind Nx's Lightning Fast Execution", Dec. 16, 2020, pp. 1-11, https://blog.nrwl.io/computation-caching-the-fundamentals-behind-nxs-lightning-fast-execution-dc761fe41eb8.

Havinga, Wilke et al. "Prototyping and Composing Aspect Languages Using an Aspect Interpreter Framework", ECOOP 2008—Object-Oriented Programming; [Lecture Notes in Computer Science], Jul. 7, 2008, pp. 180-206.

Nov. 26, 2024 Office Action issued in Japanese Patent Application No. 2021-053657.

* cited by examiner

FIG. 2

INFORMATION STORED IN FLOW DB

2A

| FLOW ID | 1ST | 2ND | 3RD | ... | FLOW DETAIL INFORMATION |
|---|---|---|---|---|---|
| AAA | AAA-PLUG-IN DEFINITION 1 | AAA-PLUG-IN DEFINITION 2 | AAA-PLUG-IN DEFINITION 3 | ... | ... |
| BBB | BBB-PLUG-IN DEFINITION 1 | BBB-PLUG-IN DEFINITION 2 | BBB-PLUG-IN DEFINITION 3 | ... | ... |
| ... | ... | ... | ... | | |
| NNN | NNN-PLUG-IN DEFINITION 1 | NNN-PLUG-IN DEFINITION 2 | NNN-PLUG-IN DEFINITION 3 | | ... |

INFORMATION PROCESSING SYSTEM, INFORMATION PROCESSING METHOD AND COMPUTER READABLE MEDIUM

CROSS-REFERENCE TO RELATED APPLICATIONS

This application is based on and claims priority under 35 USC 119 from Japanese Patent Application No. 2021-053657 filed on Mar. 26, 2021.

BACKGROUND

1. Technical Field

The present disclosure relates to an information processing system, an information processing method and a computer readable medium storing a program.

2. Related Art

JP-A-2001-147964 discloses a process including: searching a DB by HC to determine whether order data having predetermined association with transmitted order data is in the DB; and when it is determined that the order data having the predetermined association with the transmitted order data is in the DB, processing the order data as invalid in the DB.

SUMMARY

In an information processing system that processes a document, when a target document, which is a document as a processing target, is input, the target document may be processed.

Here, when the target document is processed without considering processes performed in the past, for example, a document already processed may be subjected again to the process already performed. In this case, a process that is not originally scheduled, such as double transmission of information, may be executed.

Aspects of non-limiting embodiments of the present disclosure relate to providing an information processing system capable of appropriately determining whether a process already performed on a document can be performed on the document, as compared with a case where a process is to be performed on a document without considering that the process was performed on the document in the past.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor, in which the processor is configured to: acquire a feature of a target document that is a document as a processing target; acquire process information that is information on a process to be performed on the target document; acquire past information that is information on a process performed on a past document that has the feature of the target document and has been processed in the past; and decide a process to be performed on the target document based on the process information and the past information.

BRIEF DESCRIPTION OF THE DRAWINGS

Exemplary embodiment(s) of the present invention will be described in detail based on the following figures, wherein:

FIG. 2 is a diagram illustrating an example of information stored in a flow DB;

DETAILED DESCRIPTION

Hereinafter, an exemplary embodiment of the present disclosure will be described in detail with reference to the accompanying drawings.

Figure 1:
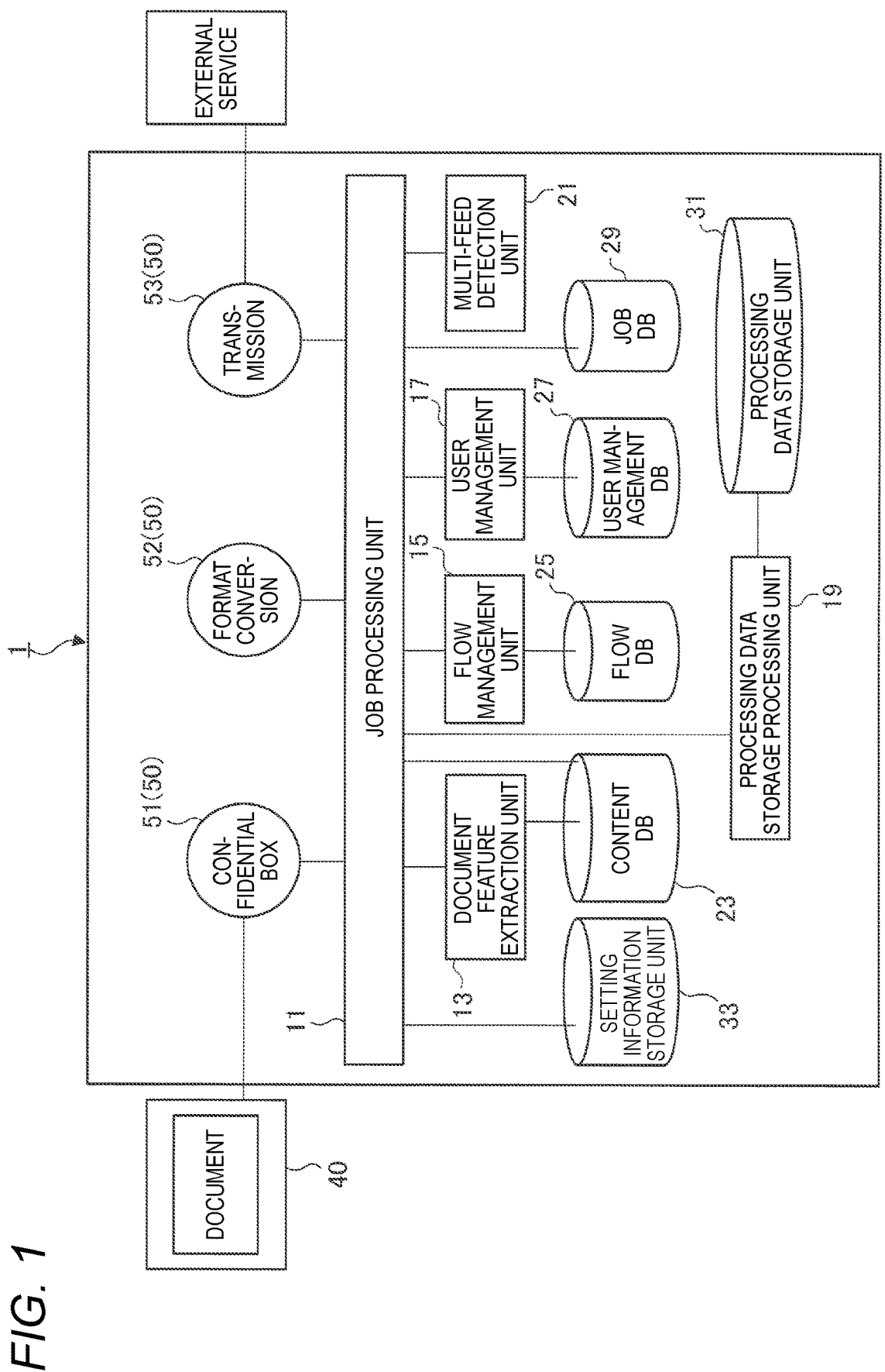
FIG. 1 is a diagram illustrating an overall configuration of an information processing system.

FIG. 1 is a diagram illustrating an overall configuration of an information processing system 1 according to the present exemplary embodiment.

The information processing system 1 according to the present exemplary embodiment includes a job processing unit 11, a document feature extraction unit 13, a flow management unit 15, a user management unit 17, a processing data storage processing unit 19, and a multi-feed detection unit 21.

In addition, the information processing system 1 includes a content database (DB) 23, a flow DB 25, a user management DB 27, a job DB 29, a processing data storage unit 31, and a setting information storage unit 33.

The job processing unit 11 passes a document input from a device 40 provided outside the information processing system 1 to each plug-in 50, and acquires a processing result from the plug-in 50.

In the present exemplary embodiment, a case is illustrated in which a document input from the device 40 provided outside the information processing system 1 is received in a confidential box plug-in 51, which is one of the plug-ins 50.

The job processing unit 11 passes the document received in the confidential box plug-in 51 to the other plug-ins 50, and acquires the processing result from the plug-ins 50.

The job processing unit 11 performs the process of passing the document to the plug-ins 50 and the process of acquiring the process result from the plug-ins 50 by the number of plug-ins associated with the flow (described later).

Each plug-in 50 performs a predetermined process on the document passed from the job processing unit 11, and returns a result of the process (information such as a processed document) to the job processing unit 11.

The flow management unit 15 includes the flow DB 25. The flow management unit 15 stores information on a combination of plural plug-ins set by the user in the flow DB 25 for each combination.

FIG. 2 is a diagram illustrating an example of the information stored in the flow DB 25.

In the present exemplary embodiment, a flow ID is associated with each combination of plug-ins set by the user as indicated by a reference numeral 2A. Each combination of the plurality of plug-ins is identified based on the flow ID.

In the present exemplary embodiment, in each flow ID, the plurality of plug-ins to be executed are registered in an order to be executed. In other words, information on the order of execution of the plurality of plug-ins is also registered in the flow DB 25.

In the present exemplary embodiment, a plug-in to be executed first is registered in a column titled "first" in the figure, which is a leftmost column, and a plug-in to be executed thereafter is arranged on the right in the figure.

Flow detail information, which is detailed information of the flow, is registered in the flow DB 25 in association with each flow ID. The flow detail information is, for example, information related to the plug-ins constituting the flow and setting of the plug-ins.

In the present exemplary embodiment, each time one job is executed, information on this job is stored in the processing data storage unit 31 (see FIG. 1).

Figure 3:
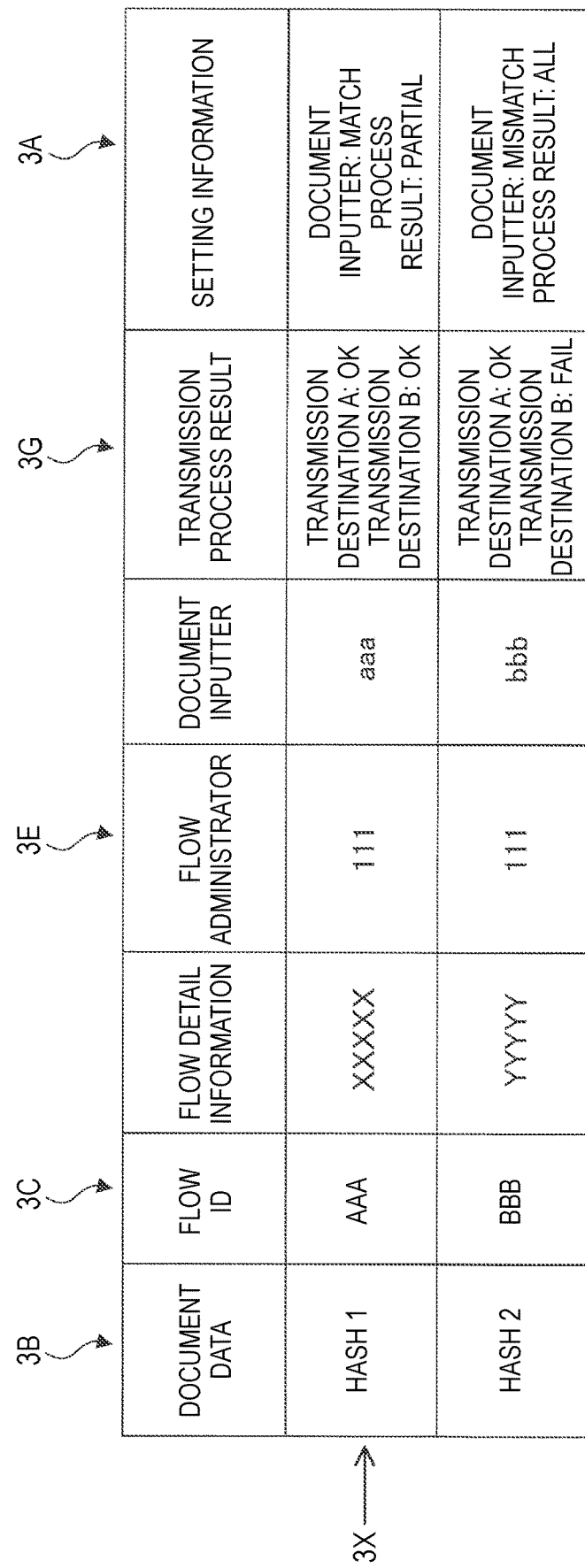
FIG. 3 is a diagram illustrating information stored in a processing data storage unit.

FIG. 3 is a diagram illustrating the information stored in the processing data storage unit 31.

As indicated by a reference numeral 3X in FIG. 3, the processing data storage unit 31 stores document data of the input document, the flow ID of the flow used for processing the document, and the flow detail information in a state of being associated with one another. Such information is an example of information on a process to be performed on the document.

Here, the "document data" stored in the processing data storage unit 31 is data including information indicating a feature of the document, such as data of the document per se. The document data may be either document data per se or data obtained by extracting a feature of the document such as a hash value.

In addition, the processing data storage unit 31 also stores information on a flow administrator, which is an administrator associated with each flow in advance, in a state associated with the document data.

The processing data storage unit 31 also stores information on the document inputter who input the document to the information processing system 1.

In the present exemplary embodiment, information on the document inputter who input the document to the information processing system 1, such as a user ID, is acquired from the device 40 (see FIG. 1) which outputs the document to the information processing system 1. The information on the document inputter is stored in the processing data storage unit 31 in a state of being associated with the document data.

In the present exemplary embodiment, as indicated by a reference numeral 3G, the processing data storage unit 31 also stores information on a result of a transmission process performed along with the execution of the job. In other words, in the present exemplary embodiment, information indicating whether the transmission process of the information to the outside has been normally ended is also stored in the processing data storage unit 31. Here, in the present specification, "normally" refers to a state in which an originally scheduled result is obtained.

In the present exemplary embodiment, the information indicating whether the transmission process of the information to the outside is been normally ended is also stored in the processing data storage unit 31 in a state associated with the document data.

Further, in the present exemplary embodiment, when plural transmission destinations of information are set, information indicating whether the transmission process has been normally ended is stored for each transmission destination of the information.

In the present exemplary embodiment, plural transmission destinations may be set in a transmission plug-in 53 (see FIG. 1) used for transmission of information, or plural transmission plug-ins 53 having different transmission destinations may be included in one flow.

In this case, the processing data storage unit 31 stores information indicating whether the transmission process of the information has been normally ended for each transmission destination.

In the present exemplary embodiment, each time one job is executed, the processing data storage processing unit 19 (see FIG. 1) stores information on the job in the processing data storage unit 31.

Specifically, each time one job is executed, the processing data storage processing unit 19 stores the document data, the flow ID, the flow detail information, the flow administrator, the document inputter, and the result of the transmission process in the processing data storage unit 31 in a state of being associated with one another.

In the present exemplary embodiment, the processing data storage processing unit 19 also associates setting information (described later) with the document data, the flow ID, the flow detail information, the flow administrator, the document inputter, and the result of the transmission process as indicated by a reference numeral 3A in FIG. 3.

In the present exemplary embodiment, a user registers flows including the combination of the plurality of plug-ins 50 in advance. In the present exemplary embodiment, the information of each of the plurality of plug-ins associated with the registered flow is registered in the flow DB 25 (see FIG. 2) for each flow ID.

In the information processing system 1 according to the present exemplary embodiment, the process on the document input to the information processing system 1 is performed in order by the plug-ins 50 included in the flow associated with the confidential box plug-in 51 to which the document is input or a flow designated by the user. In other words, in the present exemplary embodiment, one process is configured with a process obtained by combining plural processes, and the processes included in the plurality of processes are performed in order on the document input to the information processing system 1.

The plug-in 50 refers to software for expanding a function of an application. When the plug-in 50 is installed in the information processing system 1, a function of an application already installed in the information processing system 1 is expanded.

Here, in the present exemplary embodiment, examples of the plug-in 50 include the confidential box plug-in 51, a format conversion plug-in 52, and a transmission plug-in 53. These are merely examples, and other plug-ins having other functions such as a plug-in for performing OCR (Optical Character Reader) process on a document are also present.

The confidential box plug-in 51 is a plug-in for acquiring a document in a predetermined format such as "acquiring a document in JPEG".

The format conversion plug-in 52 is a plug-in for converting a format of a document into another format, such as "converting JPEG into TIFF".

The transmission plug-in 53 is a plug-in for transmitting a processed document to a designated external service (an external transmission destination of the information processing system 1) or the like.

Figure 4:
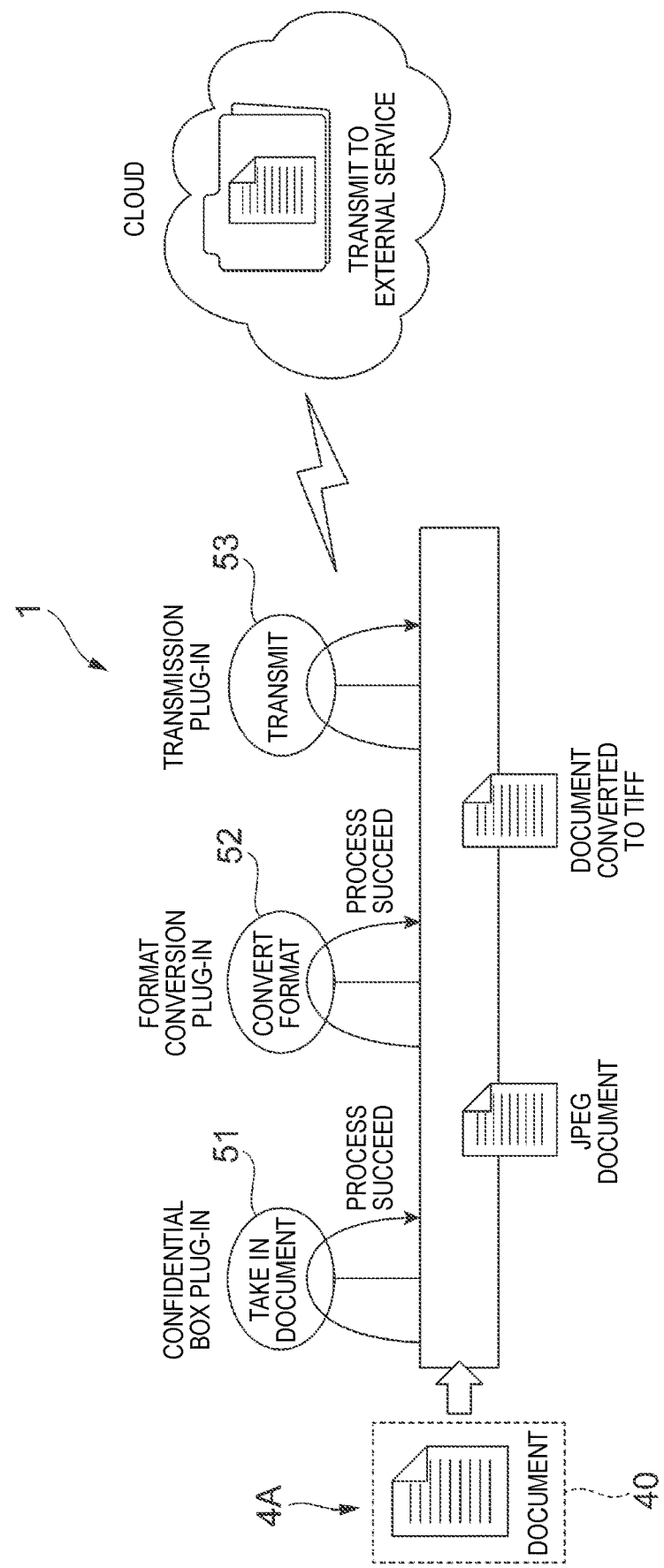
FIG. 4 is a diagram illustrating a process executed by plug-ins.

When these plug-ins 50 are associated with one flow in this order, a process illustrated in FIG. 4 (a diagram illustrating a process executed by the plug-ins 50) is performed when the flow is executed.

First, for example, a document scanned by the device 40 (a document indicated by a reference numeral 4A) is taken into the information processing system 1 as JPEG image data by the confidential box plug-in 51.

Next, the format conversion plug-in 52 converts the format of the document from JPEG to TIFF.

Next, the transmission plug-in 53 transmits the document converted to TIFF to the designated external service.

Figure 5:
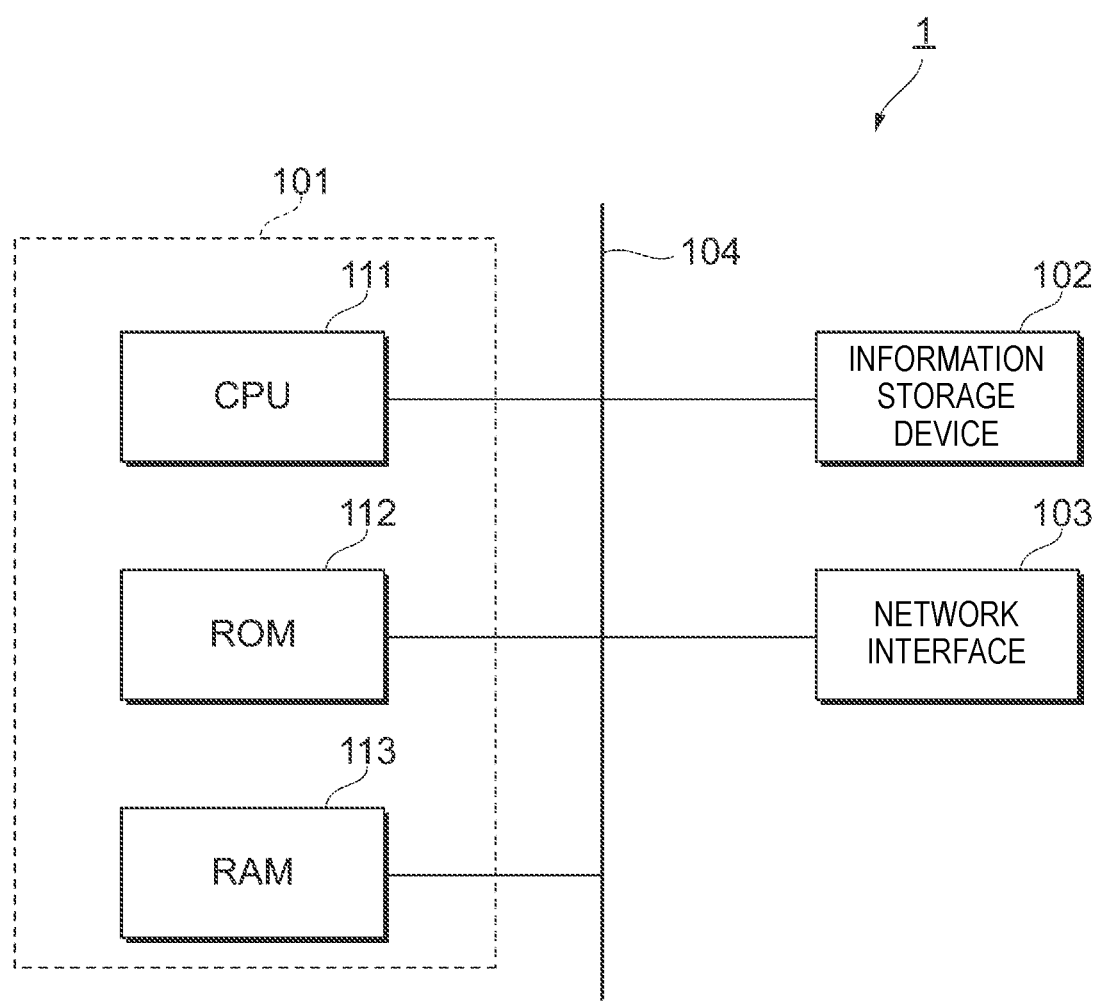
FIG. 5 is a diagram illustrating an example of a hardware configuration of the information processing system.

FIG. 5 is a diagram illustrating an example of a hardware configuration of the information processing system 1.

The information processing system 1 of the present exemplary embodiment is provided with an information processing unit 101, an information storage device 102 that stores information, and a network interface 103 that realizes communication via a LAN (Local Area Network) cable, etc.

The information storage device 102 is realized by an existing information storage device such as a hard disk drive, a semiconductor memory, and a magnetic tape.

The information processing unit 101 includes a CPU (Central Processing Unit) 111 as an example of a processor, a ROM (Read Only Memory) 112 in which basic software, a BIOS (Basic Input Output System), and the like are stored, and a RAM (Random Access Memory) 113 used as a work area.

The CPU 111 may be multi-core. The ROM 112 may be a rewritable non-volatile semiconductor memory. The information processing unit 101 is a so-called computer.

The information processing unit 101, the information storage device 102, and the network interface 103 are connected via a bus 104 and a signal line (not shown).

Here, programs executed by the CPU 111 may be provided to the information processing system 1 in a state of being stored in a computer-readable recording medium such as magnetic recording medium (magnetic tape, magnetic disk, and the like), optical recording medium (optical disk, and the like), optical magnetic recording medium, semiconductor memory, and the like. In addition, the programs executed by the CPU 111 may be provided to the information processing system 1 by using a communication unit such as the Internet.

In the present exemplary embodiment, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the present exemplary embodiment, the term "processor" is broad enough to encompass one processor or plural processors in collaboration which are located physically apart from each other but may work cooperatively. The order of operations of the processor is not limited to one described in the present exemplary embodiment above, and may be changed.

In the present exemplary embodiment, the CPU 111 as an example of a processor executes a program stored in the ROM 112 or the information storage device 102 to realize the job processing unit 11, the document feature extraction unit 13, the flow management unit 15, the user management unit 17, the multi-feed detection unit 21, and the processing data storage processing unit 19.

In other words, in the following, each of the job processing unit 11, the document feature extraction unit 13, the flow management unit 15, the user management unit 17, the multi-feed detection unit 21, and the processing data storage processing unit 19 executes a process, and execution of the process is performed by the CPU 111 as an example of a processor.

In the present exemplary embodiment, the content DB 23, the flow DB 25, the user management DB 27, the job DB 29, the processing data storage unit 31, and the setting information storage unit 33 are realized by the information storage device 102. In the present exemplary embodiment, each plug-in 50 is stored in the ROM 112 or the information storage device 102.

Figure 6:
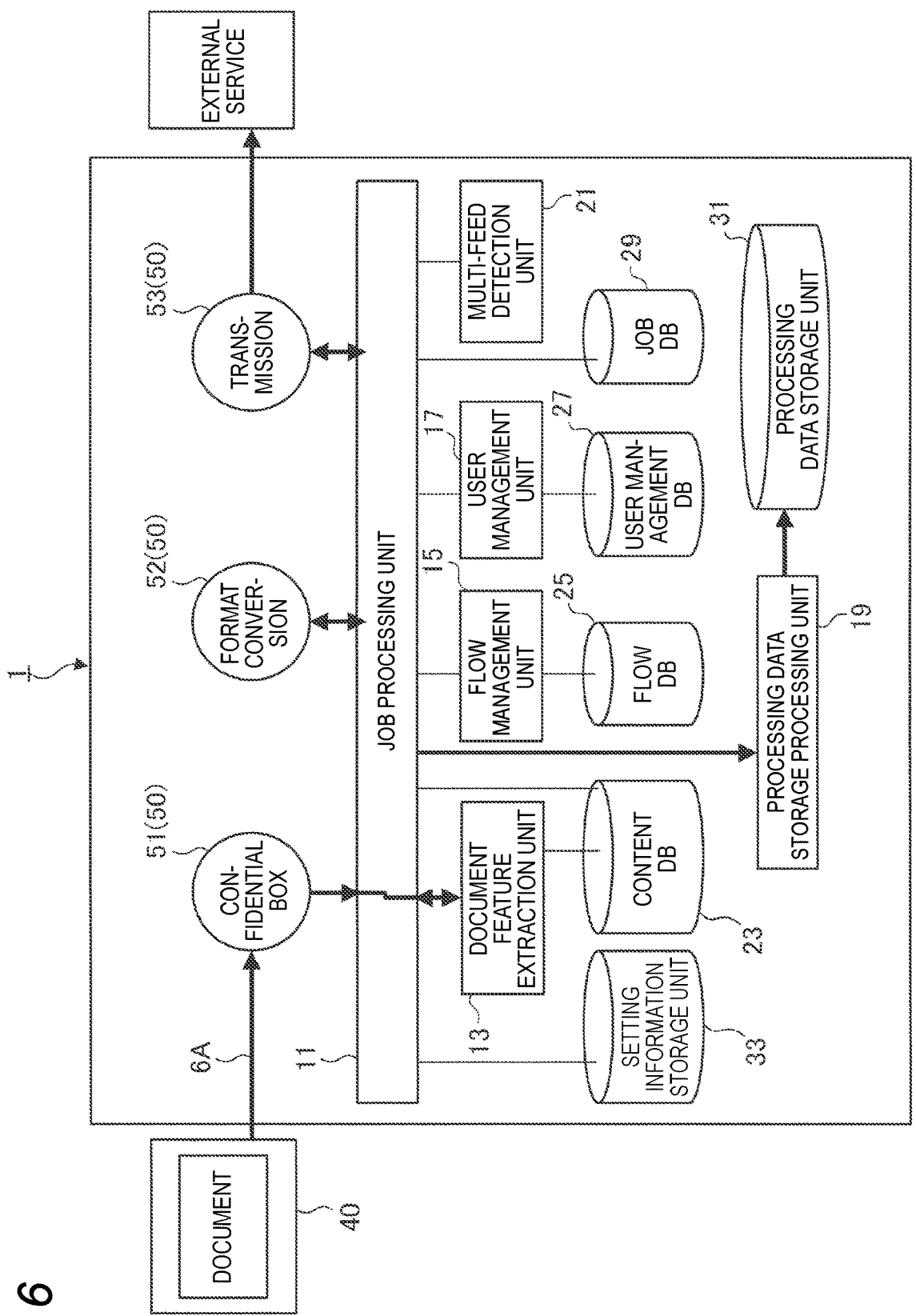
FIG. 6 is a diagram illustrating a flow of process executed in the present exemplary embodiment.

FIG. 6 is a diagram illustrating a flow of process executed in the present exemplary embodiment.

In FIG. 6, the flow of process will be described in a case where document data of an input document is not stored in the processing data storage unit 31, in other words, a case where a feature of the input document is not stored in the processing data storage unit 31.

In the present exemplary embodiment, first, as indicated by a reference numeral 6A, a document (document data) is input to the information processing system 1.

More specifically, in this example, a document is input to the confidential box plug-in 51.

Next, in the present exemplary embodiment, the document feature extraction unit 13 acquires the feature of the document input to the confidential box plug-in 51. Specifically, the document feature extraction unit 13 acquires a hash value or the like as the feature of the document.

In the present exemplary embodiment, the processing data storage processing unit 19 determines whether the feature of the document is stored in the processing data storage unit 31.

When the processing data storage processing unit 19 determines that the feature of the document is not stored in the processing data storage unit 31, the processing data storage processing unit 19 stores the feature of the document in the processing data storage unit 31. Specifically, the feature is stored in a document data column indicated by a reference numeral 3B in FIG. 3 in the processing data storage unit 31.

In addition, in this case, the processing data storage processing unit 19 stores the flow ID and the flow detail information in the processing data storage unit 31 along with this feature.

Specifically, the processing data storage processing unit 19 stores the information in the processing data storage unit 31 in a state in which the flow ID for identifying the flow used for processing the document and the flow detail information indicating the specific content of the flow are associated with the feature of the document.

In the present exemplary embodiment, the flow ID is associated with each confidential box plug-in 51 in advance, and the processing data storage processing unit 19 grasps the flow ID based on the confidential box plug-in 51 to which the document is input. The processing data storage processing unit 19 refers to the flow DB 25 (see FIG. 2) and grasps the flow detail information associated with the flow ID.

Then, the processing data storage processing unit 19 associates the acquired flow ID and flow detail information with the feature of the document, and stores the information in the processing data storage unit 31.

Further, the processing data storage processing unit 19 stores information on the flow administrator and information on the document inputter who input the document in the processing data storage unit 31 in association with the feature, the flow ID, and the flow detail information of the document.

In the present exemplary embodiment, a case has been described in which the flow ID is acquired based on the confidential box plug-in 51 to which the document is input. However, the present disclosure is not limited thereto, and the flow ID may be designated by the user each time a document is input, and the flow ID obtained via the designation may be stored in the processing data storage unit 31 in association with the feature of the document.

Thereafter, in the present exemplary embodiment, the process on the document performed by each plug-in 50 (see FIG. 6) is performed in order. When the process performed by the last transmission plug-in 53 is completed, the processing data storage processing unit 19 stores a transmission process result, which is information indicating whether the transmission process has been normally ended, in the processing data storage unit 31. Specifically, the transmission process result is stored in the column indicated by the reference numeral 3G in FIG. 3.

In this case as well, the information on the transmission process result is stored in the processing data storage unit 31 in a state of being associated with the feature, the flow ID, the flow detail information, the flow administrator, and the document inputter of the document.

In the present exemplary embodiment, when storing the transmission process result in the processing data storage unit 31, as described above, information indicating whether the transmission process has been normally ended is stored for each transmission destination.

Specifically, in the present exemplary embodiment, plural transmission destinations may be set in the transmission plug-in 53, or plural transmission plug-ins 53 having different transmission destinations may be used. In this case, information indicating whether the transmission process has been normally ended is stored in the processing data storage unit 31 for each of the plurality of transmission destinations. This information indicating whether the process has been normally ended is also included in the information on the process.

Through the above process, for example, as illustrated in FIG. 3, information is stored in each column of the processing data storage unit 31. FIG. 3 illustrates a state of the processing data storage unit 31 after the process on two documents is performed.

Figure 7:
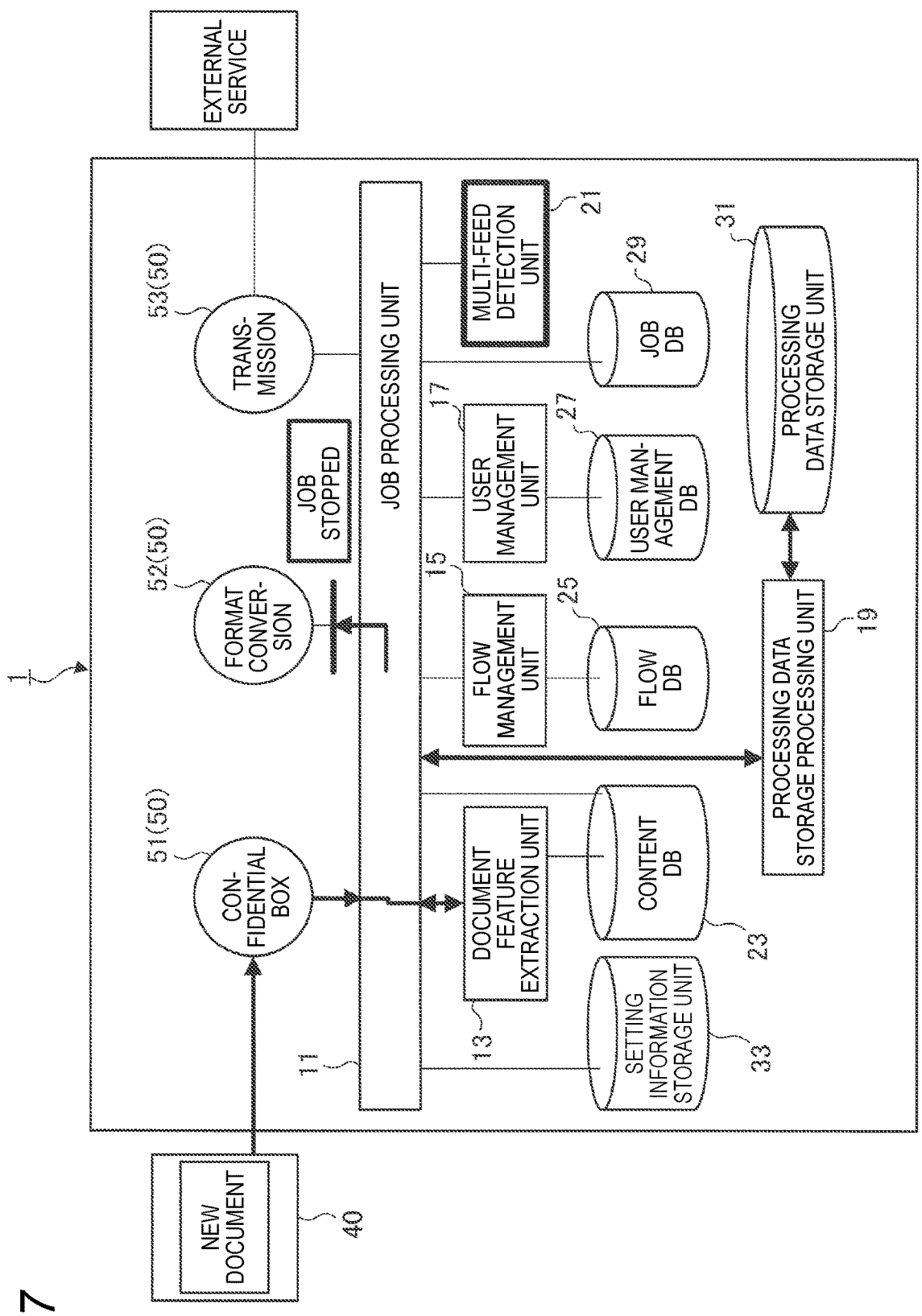
FIG. 7 is a diagram illustrating an example of process executed when a new document is input.

FIG. 7 is a diagram illustrating an example of process executed when a new document is input.

In FIG. 7, the flow of process will be described in a case where the feature of the input document is already stored in the processing data storage unit 31.

In this process example illustrated in FIG. 7, similarly to the above, first, a document (document data) is input to the confidential box plug-in 51.

Then, the document feature extraction unit 13 acquires a feature of the document to be processed (hereinafter, referred to as a "target document"). Specifically, the document feature extraction unit 13 acquires a feature such as a hash value.

Next, the processing data storage processing unit 19 determines whether information on a past document, which has the feature of the target document and has been processed in the past, is stored in the processing data storage unit 31.

More specifically, the processing data storage processing unit 19 determines whether a feature the same as or similar to the feature obtained from the target document is stored in the column in which the document data is stored (the column denoted by the reference numeral 3B in FIG. 3) in the processing data storage unit 31.

More specifically, the processing data storage processing unit 19 determines whether the feature obtained from the target document or a feature whose difference from the feature stored in the processing data storage unit 31 falls within a predetermined threshold range is stored in the processing data storage unit 31.

When the processing data storage processing unit 19 determines that the information on the past document having the feature of the target document is stored in the processing data storage unit 31, the processing data storage processing unit 19 refers to the information stored in the processing data storage unit 31 and acquires information on the process performed on the past document (hereinafter referred to as "past information").

Specifically, the processing data storage processing unit 19 acquires the flow ID of the flow used for processing the past document from the processing data storage unit 31. In other words, the processing data storage processing unit 19 acquires the flow ID stored in the processing data storage unit 31 in association with the past document.

Next, the multi-feed detection unit 21 acquires the flow ID of the past document obtained by the processing data storage processing unit 19.

The multi-feed detection unit 21 also grasps the flow ID of the flow used for processing the target document. Specifically, the multi-feed detection unit 21 grasps the flow ID of the flow used for processing the target document based on the confidential box plug-in 51 to which the target document is input.

In other words, the multi-feed detection unit 21 acquires process information that is information on a process to be performed on the target document.

Then, the multi-feed detection unit 21 determines whether the flow ID of the past document matches the flow ID of the target document. Then, the multi-feed detection unit 21 notifies the job processing unit 11 of a result of this determination.

When the job processing unit 11 receives a determination result indicating that the flow IDs match each other from the multi-feed detection unit 21, the job processing unit 11 decides to not perform the process to be performed on the target document (newly input document).

In other words, the job processing unit 11 decides to not perform the process to be performed on the target document in a case where the flow ID that is the identification information associated with the process performed on the past document matches the flow ID that is the identification information associated with the process to be performed on the target document.

In other words, the job processing unit 11 decides to not perform the process to be performed on the target document when the same process as the process performed on the past document is to be performed on the target document.

In other words, the job processing unit 11 decides to not perform the process to be performed on the target document when the process performed on the past document matches the process to be performed on the target document.

In the present exemplary embodiment, as described above, decision on the process to be performed on the target document is performed based on the acquired past information and the acquired process information.

In other words, in the present exemplary embodiment, decision on the process to be performed on the target document is performed based on the flow ID as an example for identification information associated with the process performed on the past document and the flow ID as an example of identification information associated with the process to be performed on the target document.

According to the above process, in the present exemplary embodiment, the same process is prevented from being executed for the same document, the same information is prevented from being transmitted to the same transmission destination plural times. In other words, multi-feed of the same information is prevented.

In the information processing system 1 of the present exemplary embodiment, transmission process of information to the external service may be performed plural times unintentionally, and transmission process for the same information may be performed plural times.

Specifically, in the present exemplary embodiment, even though the job is normally completed, the user may execute the job again, and accordingly, the transmission process for the same document may be performed plural times.

More specifically, in the present exemplary embodiment, when a timing determined as time-out by the job processing unit 11 is close to a timing at which the job ends, a normally ended job may be determined as time-out.

In this case, an error is notified to the user, and the user executes the job again even though the job has been normally ended in fact.

In this case, as described above, transmission process for the same information may be performed plural times. Therefore, in the present exemplary embodiment, by performing the above-described process, such transmission for plural times is prevented.

When it is decided to not perform the process to be performed on the target document, in the present exemplary embodiment, a notification indicating that the process on the target document is not to be performed is issued to the flow administrator or the document inputter of the target document through a communication line (not illustrated).

The information on the flow administrator is registered in a column indicated by a reference numeral 3E in the processing data storage unit 31 (see FIG. 3), and by referring to this column, the flow administrator may be specified.

In addition, information such as a user ID is transmitted along with the target document from the device 40 (see FIG. 7). By obtaining the user ID, the document inputter of the target document may be specified.

The user management unit 17 (see FIG. 7) refers to the user management DB 27 and acquires information on a notification destination of each of the specified users, such as an e-mail address.

Then, the user management unit 17 notifies each notification destination that the process for the target document is not to be performed via a communication line (not illustrated).

In the present exemplary embodiment, in a case where the process for the target document is not to be performed, the notification process is performed as described above, but the present disclosure is not limited thereto, and information indicating that the process for the target document is not to be performed may be stored in a database that stores a progress state of each job.

In this case, the flow administrator or the document inputter may understand that the process for the target document is not to be performed by accessing the database.

On the other hand, the job processing unit 11 decides to perform the process to be performed on the target document when the flow ID of the target document is different from the flow ID of the past document.

In other words, the job processing unit 11 decides to perform the process to be performed on the target document when the process to be performed on the target document does not match the process performed on the past document.

Here, it is decided to not perform the process to be performed on the target document when the flow ID of the target document matches the flow ID of the past document.

However, the present disclosure is not limited thereto, and may decide to perform the process to be performed on the target document if a predetermined specific condition is satisfied, even when the flow IDs match each other.

Specifically, for example, it may be performed to decide to perform the process to be performed on the target document if a setting made on the process to be performed on the target document is different from a setting made on the process performed on the past document, even when the flow IDs match each other.

For example, it may be performed to decide to perform the process to be performed on the target document if a setting related to transmission process of information included in the process to be performed on the target document is different from a setting related to transmission process of information included in the process performed on the past document.

For example, it may be performed to decide to perform the process to be performed on the target document if the transmission plug-in 53 used in the process to be performed on the target document is different from the transmission plug-in 53 used in the process performed on the past document, even when the flow IDs match each other.

In the present exemplary embodiment, after the user executes a job for a first time, the user may edit the flow and then execute the job again.

In the present exemplary embodiment, the flow may be edited without changing the flow ID, and the user may edit the flow while maintaining the flow ID and execute the job again.

Specifically, for example, the user may change the transmission plug-in 53 to another transmission plug-in 53 having a different transmission destination while maintaining the flow ID, and then execute the job again.

In addition, for example, the user may change the process result by the transmission plug-in 53 to a different one while maintaining the flow ID, and then execute the job again.

More specifically, for example, the user may change a format, an attribute, a parameter, and the like of the data for transmission obtained after being processed by the transmission plug-in 53 while maintaining the flow ID, and then execute the job again.

When such change is made by the user, it may also be considered that another process is to be performed thereafter, in which case the process for the target document may be continuously performed even when the flow IDs match each other.

Therefore, in the present exemplary embodiment, the process to be performed on the target document is continuously performed if a predetermined specific condition is satisfied, even when the flow IDs match each other.

More specifically, for example, the process to be performed on the target document is continuously performed if the transmission plug-in 53 used in the process to be performed on the target document is different from the transmission plug-in 53 used in the process performed on the past document, even when the flow IDs match each other.

Further, for example, the process to be performed on the target document is continuously performed if a setting made on the process to be performed on the target document is different from a setting made on the process performed on the past document, even when the flow IDs match each other.

In the present exemplary embodiment, when the user performs the change process while maintaining the flow ID as described above, the content of the change process is reflected in the flow detail information (see FIG. 2). More specifically, the content of the change process is stored in the flow DB 25 in association with the flow ID.

In other words, in the present exemplary embodiment, when the user performs the change process while maintaining the flow ID, the flow detail information stored in the flow DB 25 is changed in accordance with the change process.

Specifically, for example, it may be performed to decide to perform the process to be performed on the target document if the document inputter who input the target document is different from the document inputter who input the past document, even when the flow IDs match each other.

In other words, the process to be performed on the target document may be continuously performed in a case where the document inputter who input the past document to the information processing system 1 is different from the document inputter who input the target document to the information processing system 1, even when the process performed on the past document is to be performed on the target document.

In the present exemplary embodiment, information on the document inputter who input the past document is stored in the processing data storage unit 31 (see FIG. 3).

Further, in the present exemplary embodiment, based on the user ID and the like transmitted from the device 40, information on the document inputter who input the target document is acquired.

Then, in the present exemplary embodiment, the process to be performed on the target document may be performed when the document inputters are different from each other, even when the flow IDs match each other.

Here, similarly to the above, even when the job IDs match each other, it may be considered that another process is substantially performed when the document inputters are different from each other.

In this case, the process for the target document may be continuously performed, even when the flow IDs match each other.

Otherwise, it may be performed to decide to perform the process to be performed on the target document in a case where at least a part included in the process performed on the past document has not been normally ended, even when the flow IDs match each other.

More specifically, for example, the process to be performed on the target document may be performed in a case where the transmission process of the information included in the process performed on the past document has not been normally ended, even when the flow IDs match each other.

In other words, the process to be performed on the target document may be performed in a case where at least a part included in the process performed on the past document has not been normally ended, even when the process performed on the past document is to be performed on the target document.

More specifically, the process to be performed on the target document may be performed in a case where the transmission process of the information to the outside included in the process performed on the past document has not been normally ended, even when the process performed on the past document is to be performed on the target document.

The process to be performed on the target document may be performed in a case where the transmission process by the transmission plug-in 53 used in the process performed on the past document has not been normally ended, even when the process performed on the past document is to be performed on the target document.

Here, in a case where a part of the processes included in the series of processes, such as the transmission process, has not been normally ended, it is assumed that the originally planned process has not been completed.

Therefore, in this case, the process of the target document may be continuously performed so that the document is transmitted again, even when the flow IDs match each other.

Figure 8:
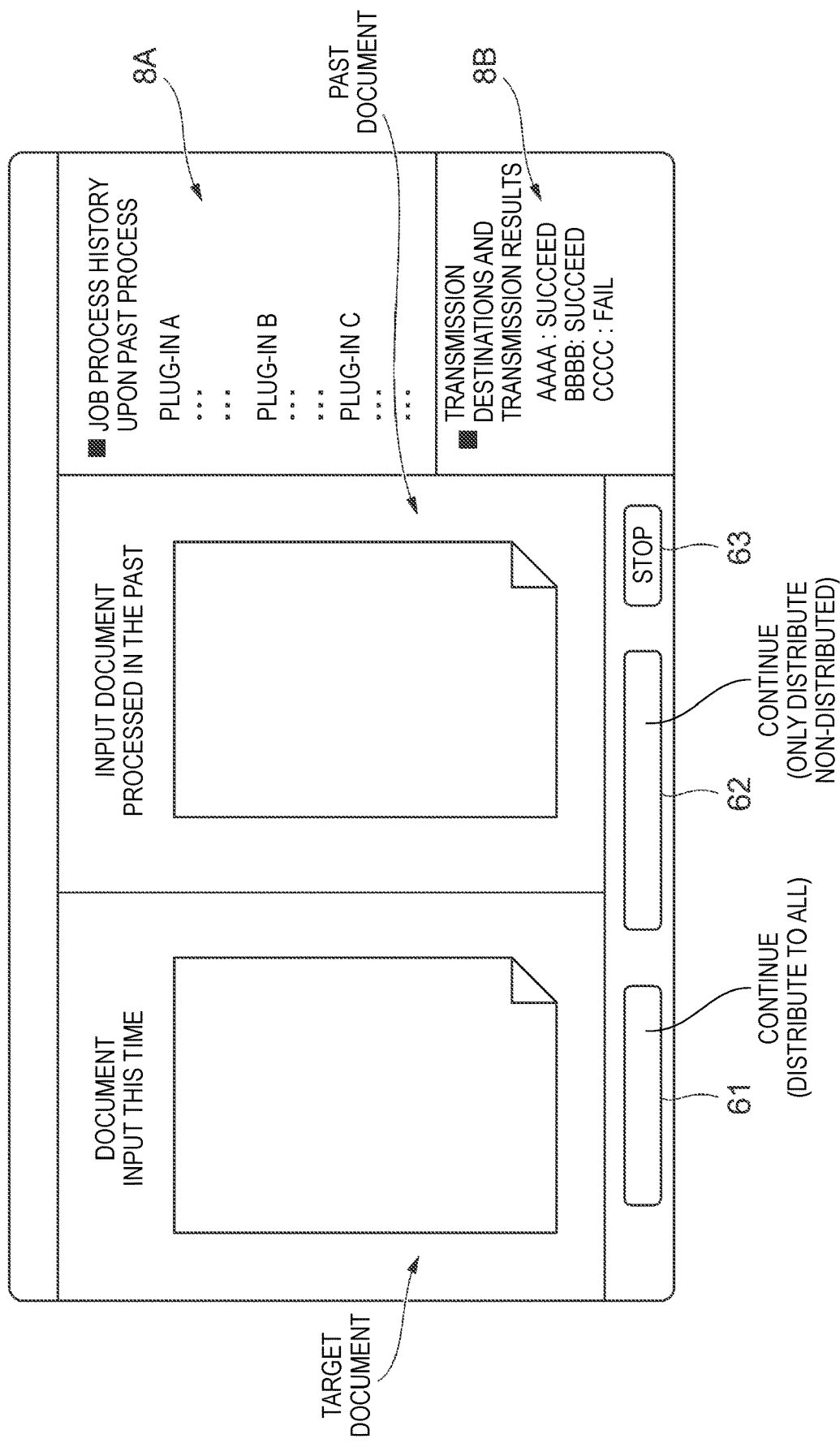
FIG. 8 is a diagram illustrating an example of a display screen displayed on a device of a document inputter who input a target document.

FIG. 8 is a diagram illustrating an example of a display screen displayed on the device 40 (see FIG. 1) of the document inputter who input the target document.

In the present exemplary embodiment, when the above decision is performed so that the process for the target document is not to be performed, the screen illustrated in FIG. 8 is displayed on the device 40 of the document inputter of the target document.

This screen illustrated in FIG. 8 displays the target document input by the document inputter and the past document. A history of the process of the past document is displayed at a position indicated by a reference numeral 8A on the screen. In other words, information on the process content of the past document is displayed.

Further, in this screen, the result of the transmission process for the past document is displayed at the position indicated by a reference numeral 8B. Specifically, in this screen, information indicating whether the transmission process for the past document has been normally ended is displayed for each transmission destination.

In this example, it is illustrated that the transmission process to a part of the transmission destinations has not been normally performed.

Further, this screen displays a first continuation button 61 for the user to instruct continuation of the process, a second continuation button 62 for the user to instruct continuation of the process, and a stop button 63 for the user to instruct stop of the process.

In the present exemplary embodiment, when the first continuation button 61 is selected by the user, the information is transmitted to all the transmission destinations including the transmission destinations to which transmission of information succeeded in the process in the past document. The expression "transmission of information succeeded" indicates that information scheduled to be transmitted at a scheduled transmission destination has arrived.

Further, when the second continuation button 62 is selected by the user, the transmission destinations to which the transmission of the information succeeded in the process in the past document are excluded, and the information is transmitted only to the transmission destinations to which the transmission of the information was not normally performed in the process in the past document.

When the stop button 63 is selected by the user, the process of the target document is stopped, and information transmission for the target document to the outside is not to be performed.

In the present exemplary embodiment, the user may perform setting on a determination condition.

Figure 9:
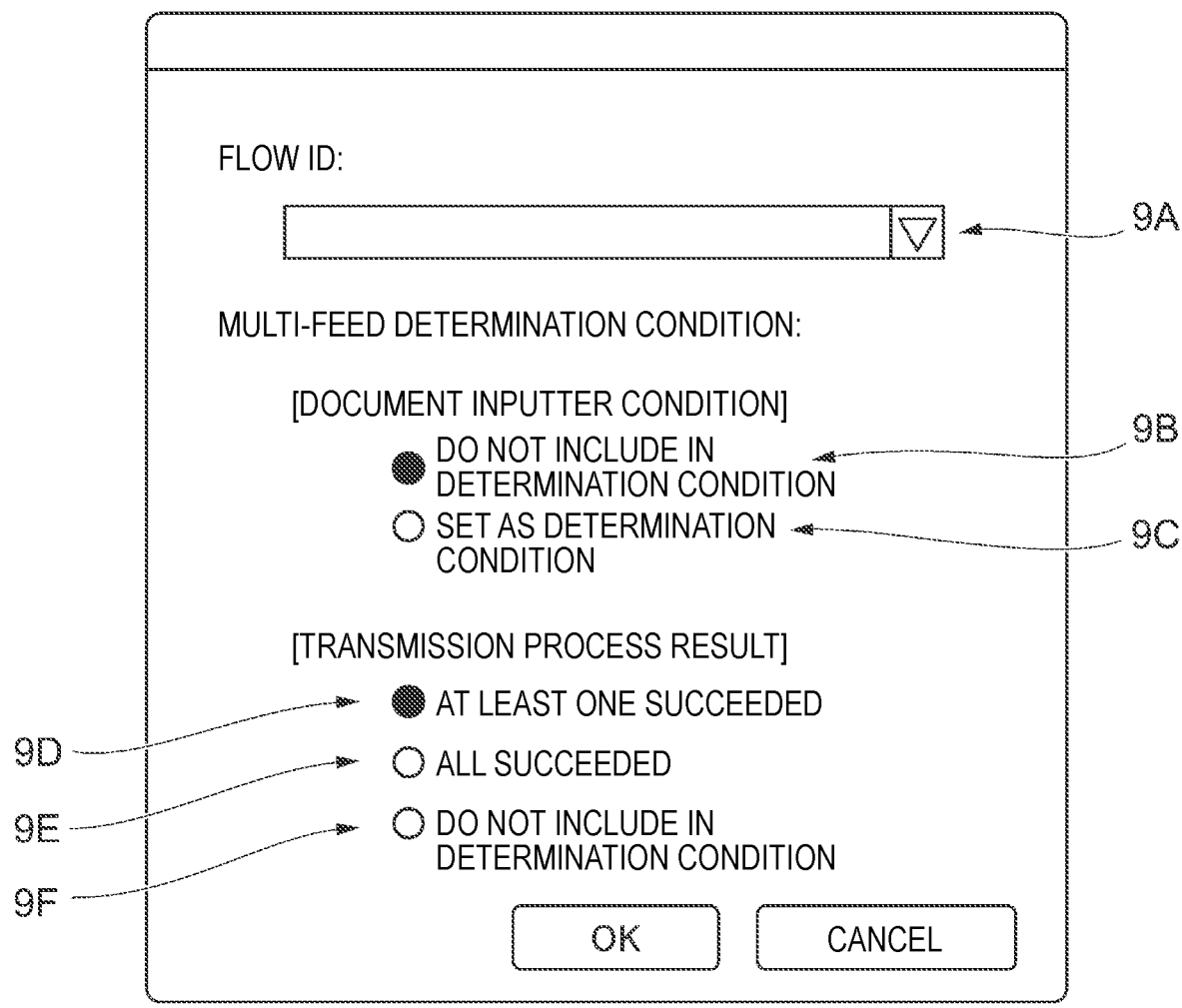
FIG. 9 is a diagram illustrating a screen that is referred to by a user when the user performs setting on a determination condition.

When the user performs setting on the determination condition, a screen illustrated in FIG. 9 (a diagram illustrating a screen that is referred to by the user when the user performs setting on the determination condition) is displayed on the device 40 operated by the document inputter or a device operated by the flow administrator (not illustrated).

This screen illustrated in FIG. 9 enables a setting as to whether the document inputter is included in the determination condition (hereinafter referred to as "inputter setting"), and a setting on a criterion for determining whether the transmission of information has been normally ended (hereinafter referred to as "determination criterion setting").

Furthermore, in the present exemplary embodiment, these settings are performed for each flow ID.

In the present exemplary embodiment, the flow ID may be selected by operating a position indicated by a reference numeral 9A in FIG. 9. After selecting the flow ID, the document inputter or the flow administrator (hereinafter, simply referred to as a "user") performs the above two settings, that is, the inputter setting and the determination criterion setting.

In the present exemplary embodiment, information on these settings performed by the user is stored in the setting information storage unit 33 (see FIG. 1).

Specifically, the information on the inputter setting and the determination criterion setting are associated with each flow ID, and the information is stored in the setting information storage unit 33.

In the present exemplary embodiment, this setting performed by the user is also reflected in the column indicated by the reference numeral 3A in the processing data storage unit 31 (see FIG. 3).

Specifically, the information on the setting performed by the user is stored in the column of setting information in the processing data storage unit 31.

More specifically, this setting performed by the user is stored in a position corresponding to the corresponding flow ID in the column of setting information.

In the present exemplary embodiment, every time the information on the past document is newly stored in the processing data storage unit 31, the information on the inputter setting and the determination criterion setting associated with the flow ID of the past document is read and acquired from the setting information storage unit 33.

Then, the acquired information on the inputter setting and the determination criterion setting is stored in the column of setting information in the processing data storage unit 31.

A default setting information is stored in the processing data storage unit 31 for flow IDs for which the user setting and the determination criterion setting are not performed by the user.

In the present exemplary embodiment, when the information on the past document is newly stored in the processing data storage unit 31, it is assumed that the inputter setting and the determination criterion setting corresponding to the flow ID of the past document is not performed yet.

In this case, default setting information set in advance for each of the inputter setting and the determination criterion setting is stored in the column of setting information in the processing data storage unit 31.

The inputter setting, which is a setting as to whether the document inputter of the document is included in the determination condition, enables a setting in which the document inputter of the document is included in the determination condition and a setting in which the document inputter of the document is not included in the determination condition.

In a case where the user selects a position indicated by a reference numeral 9C in FIG. 9 to perform the setting in which the document inputter is included in the determination condition, as described above, the process for the target document is continuously performed if the document inputters are different from each other, even when the flow IDs match each other.

In a case where the user selects a position indicated by a reference numeral 9B in FIG. 9 to perform the setting in which the document inputter is not included in the determination condition, the decision on the process for the target document is performed without considering the information on the document inputter.

In the determination criterion setting which is the criterion for determining whether the transmission of the information has been normally ended, the user may set the determination criterion from three options including "at least one succeeded", "all succeeded", and the "do not include in determination condition".

Here, in a case where the user selects the option of "at least one succeeded" indicated by a reference numeral 9D, if the transmission of the information to at least one of the plurality of transmission destinations succeeded in the transmission process in the past document, it is determined that the transmission of the information for the past document succeeded (details will be described later).

Here, in a case where the user selects the option of "all succeeded" indicated by a reference numeral 9E, if the transmission of the information to all of the plurality of transmission destinations succeeded in the transmission process in the past document, it is determined that the transmission of the information for the past document succeeded (details will be described later).

In other words, in this case, if the transmission of the information to a part of the transmission destinations included in the plurality of transmission destinations fails, it is determined that the transmission of the information on the past document fails.

Further, when the user selects the option "do not include in determination condition" indicated by a reference numeral 9F, the decision on the process for the target document is performed without considering success or failure of the transmission of the information on the past document.

Figure 10:
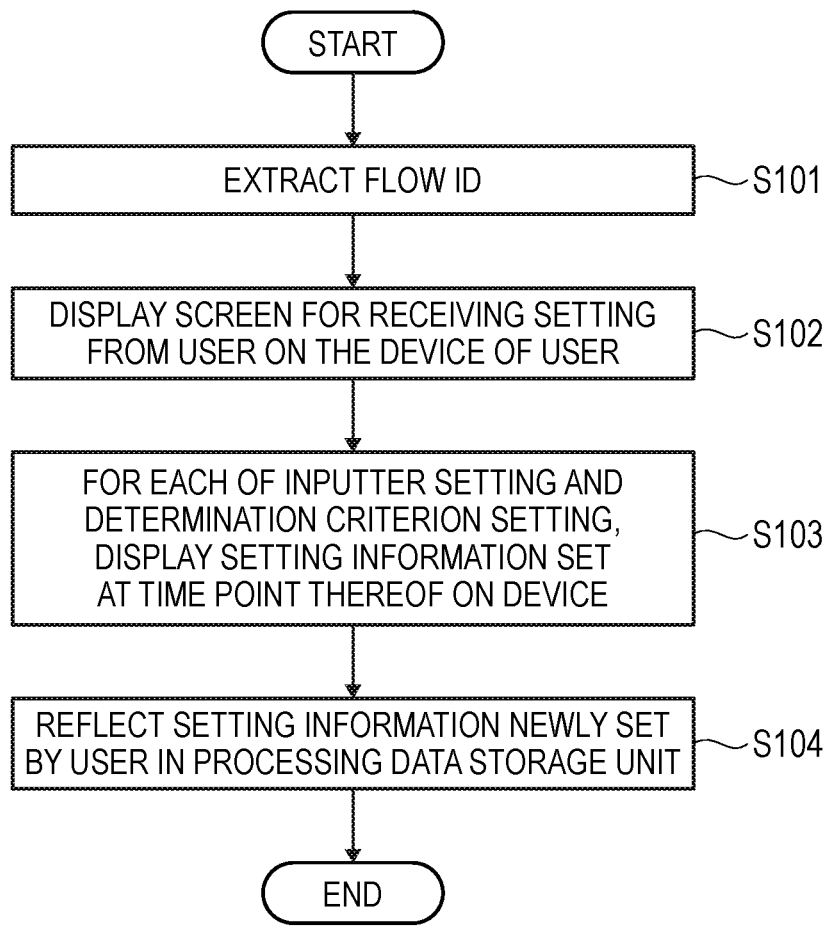
FIG. 10 is a diagram illustrating a flow of process executed when the user performs setting on the determination condition via the screen.

FIG. 10 is a diagram illustrating a flow of process executed when the user performs setting on the determination condition via the screen illustrated in FIG. 9.

In the present exemplary embodiment, first, the flow IDs stored in a column indicated by a reference numeral 3C of the processing data storage unit 31 (see FIG. 3) is extracted (step S101). If duplicate flow IDs are present, only one flow ID is extracted.

Next, the screen for receiving the setting from the user illustrated in FIG. 9 is generated, and the screen is transmitted to the device 40 of the user. As a result, the screen for receiving the setting from the user illustrated in FIG. 9 is displayed on the device 40 of the user (step S102).

Next, when the user operates the portion indicated by the reference numeral 9A in the screen displayed on the device 40 (see FIG. 9) to select the flow ID, the setting information stored in the setting information storage unit 33 in association with the flow ID is acquired.

Then, the setting information is transmitted to the device 40. As a result, the setting information set at that time point is displayed on the device 40 for each of the two settings described above including the inputter setting and the determination criterion setting (step S103).

For the flow IDs for which the user setting and the determination criterion setting are not performed by the user yet, default setting information is displayed for each of the two settings.

In the present exemplary embodiment, the user performs an operation on the screen, and performs a new setting for each of the two settings as necessary.

Then, the setting information newly set by the user is stored in the setting information storage unit 33, and the setting information stored in the setting information storage unit 33 is updated.

The setting information newly set by the user is reflected in the processing data storage unit 31 (step S104). Specifically, the setting information newly set by the user is reflected in the column indicated by the reference numeral 3A of the processing data storage unit 31 (see FIG. 3). More specifically, the setting information newly set by the user is reflected in a position corresponding to the flow ID designated by the user.

As a result, when a new target document is input thereafter, determination of the target document is performed based on the information after the reflection.

Figure 11:
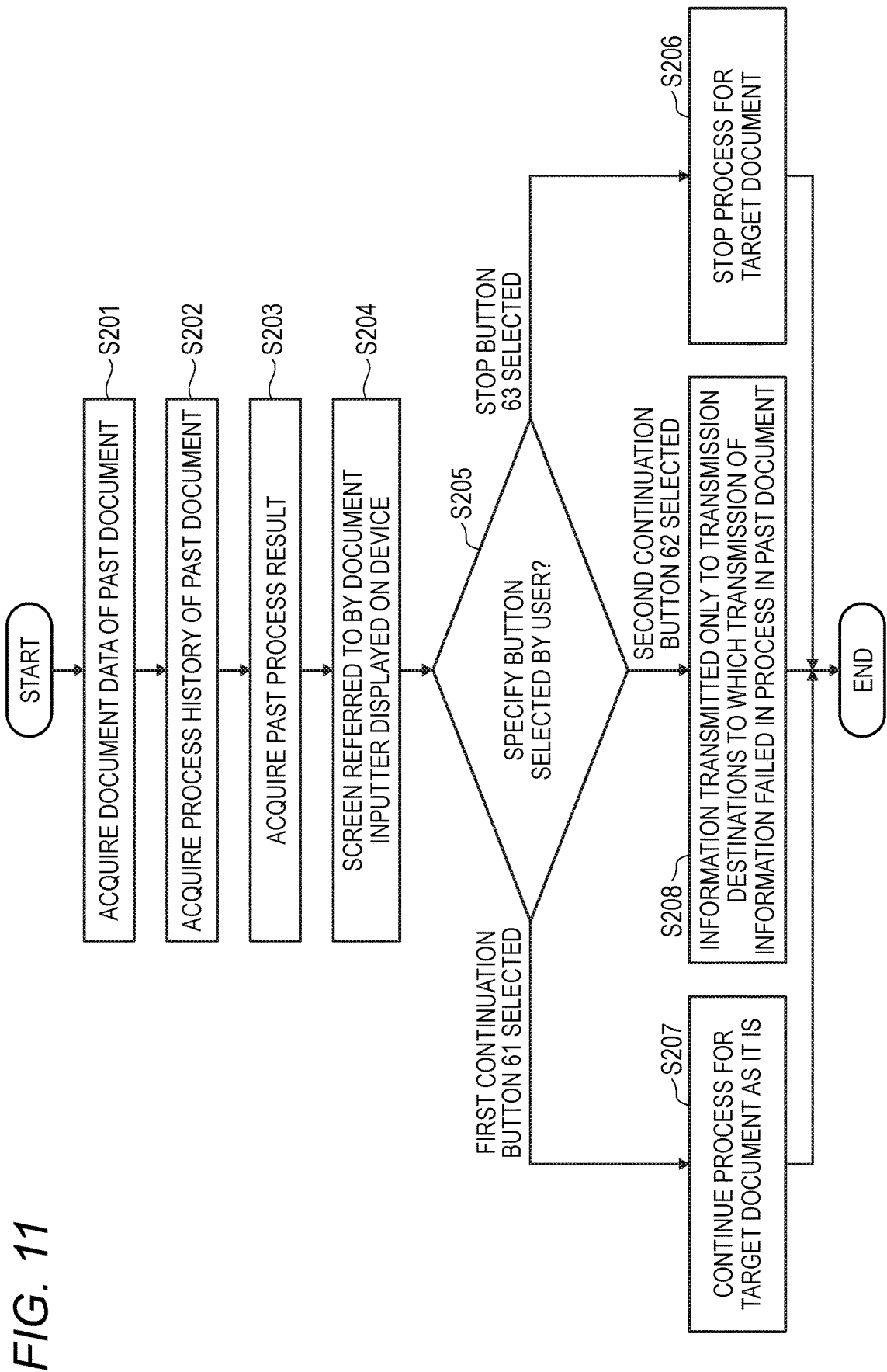
FIG. 11 is a diagram illustrating a flow of process executed when the screen is displayed.

FIG. 11 is a diagram illustrating a flow of process executed when the screen illustrated in FIG. 8 is displayed.

In the present exemplary embodiment, as described above, when it is determined that the process for the target document is not to be performed based on the information on each of the target document and the past document, the screen illustrated in FIG. 8 is displayed on the device 40 of the document inputter who input the target document.

When displaying this screen, first, the document data of the past document is acquired (step S201). Specifically, in the present exemplary embodiment, the document data of the past document is stored in the content DB 23 (see FIG. 1), and the document data of the past document is acquired from the content DB 23.

Specifically, the content DB 23 is searched based on the hash value (document data) of the past document stored in the processing data storage unit 31, so as to acquire the document data of the past document.

In the present exemplary embodiment, the job DB 29 (see FIG. 1) is searched based on the hash value of the past document stored in the processing data storage unit 31, so as to acquire a process history of the past document (step S202).

In the present exemplary embodiment, the process history of the document processed in the past is stored in the job DB 29, and the process history of the past document is acquired from the job DB 29.

Further, in the present exemplary embodiment, the past process result associated with the hash value of the past document is acquired from the processing data storage unit 31 (step S203). Specifically, the result of the transmission process to each transmission destination is acquired.

In the present exemplary embodiment, the document data of the target document input from the device 40 to the confidential box plug-in 51 is acquired.

Then, in the present exemplary embodiment, the screen illustrated in FIG. 8 is generated based on the acquired information, and the screen is transmitted to the device 40 of the document inputter who input the target document. As a result, the screen referred to by the document inputter illustrated in FIG. 8 is displayed on the device 40 (step S204).

Then, in the present exemplary embodiment, a button selected by the user among the plurality of buttons displayed on the screen is specified (step S205).

More specifically, the screen displays the first continuation button 61 and the second continuation button 62 for the user to instruct continuation of the process, and the stop button 63 for the user to instruct stop of the process. The button selected among these buttons by the user is specified.

When the button selected by the user is the stop button 63, the process for the target document is stopped (step S206).

When the button selected by the user is the first continuation button 61, the process for the target document is continued as it is (step S207), and the information is transmitted to all the transmission destinations including the transmission destinations for which the transmission of information succeeded in the process in the past document.

As described above, in the present exemplary embodiment, when permitted by the user, the process to be performed on the target document is performed, and the information is transmitted to the transmission destinations.

Further, when the button selected by the user is the second continuation button 62, the transmission destinations to which the transmission of the information succeeded in the process in the past document are excluded, and the information is transmitted only to the transmission destinations to which the transmission of the information failed in the process in the past document (step S208).

Specifically, when the button selected by the user is the second continuation button 62, it is determined whether the transmission plug-in 53 used in the process of the target document matches the transmission plug-ins 53 used in the process of the past document that failed to transmit information.

Then, when the transmission plug-ins 53 match each other, the matching transmission plug-in 53 is used to transmit the information on the target document.

In this case as well, when permitted by the user, the process to be performed on the target document is performed, and the information is transmitted to the transmission destinations.

Figure 12:
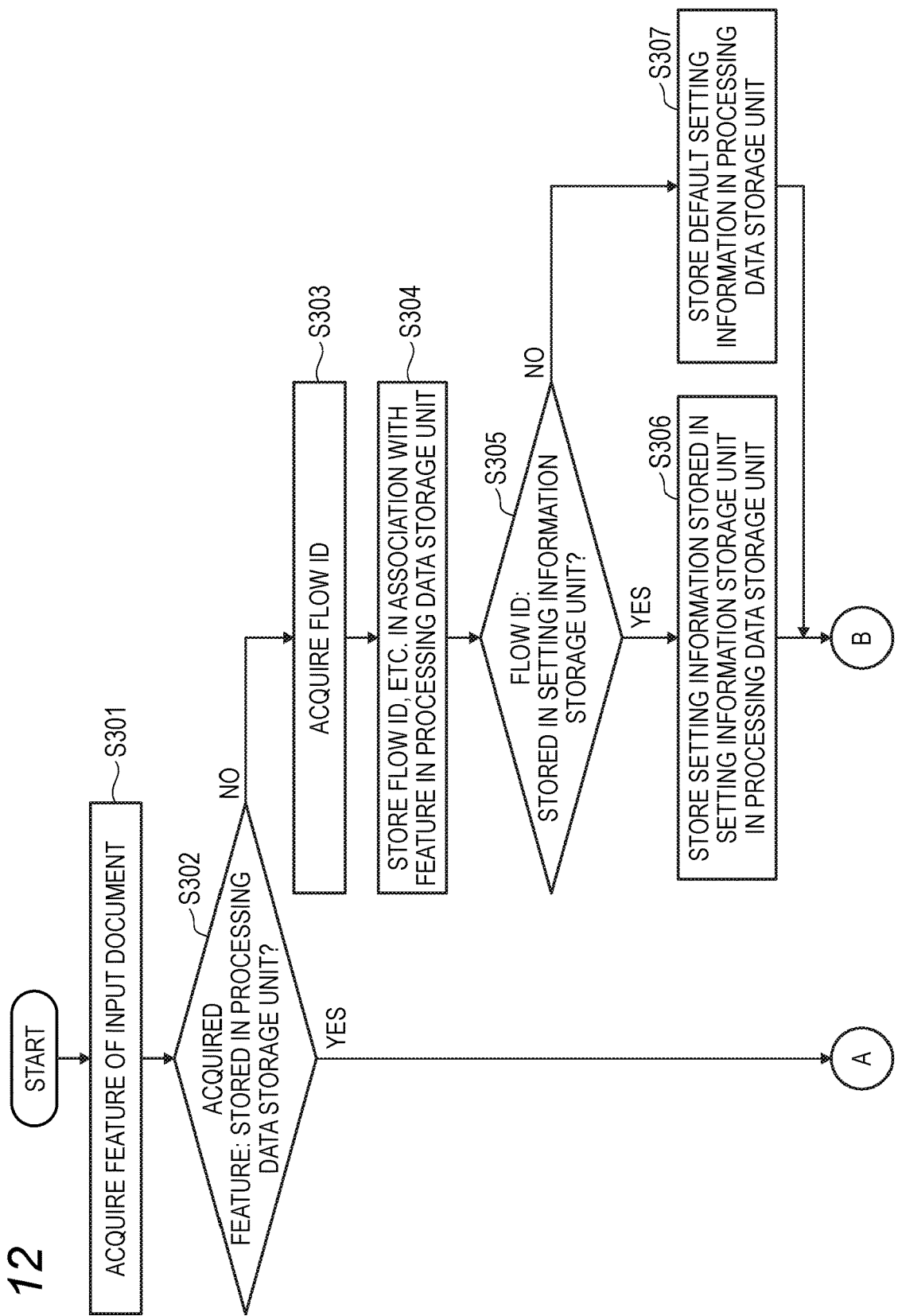
FIG. 12 is a diagram illustrating a flow of a series of processes executed when a document is input to the information processing system.
Figure 13:
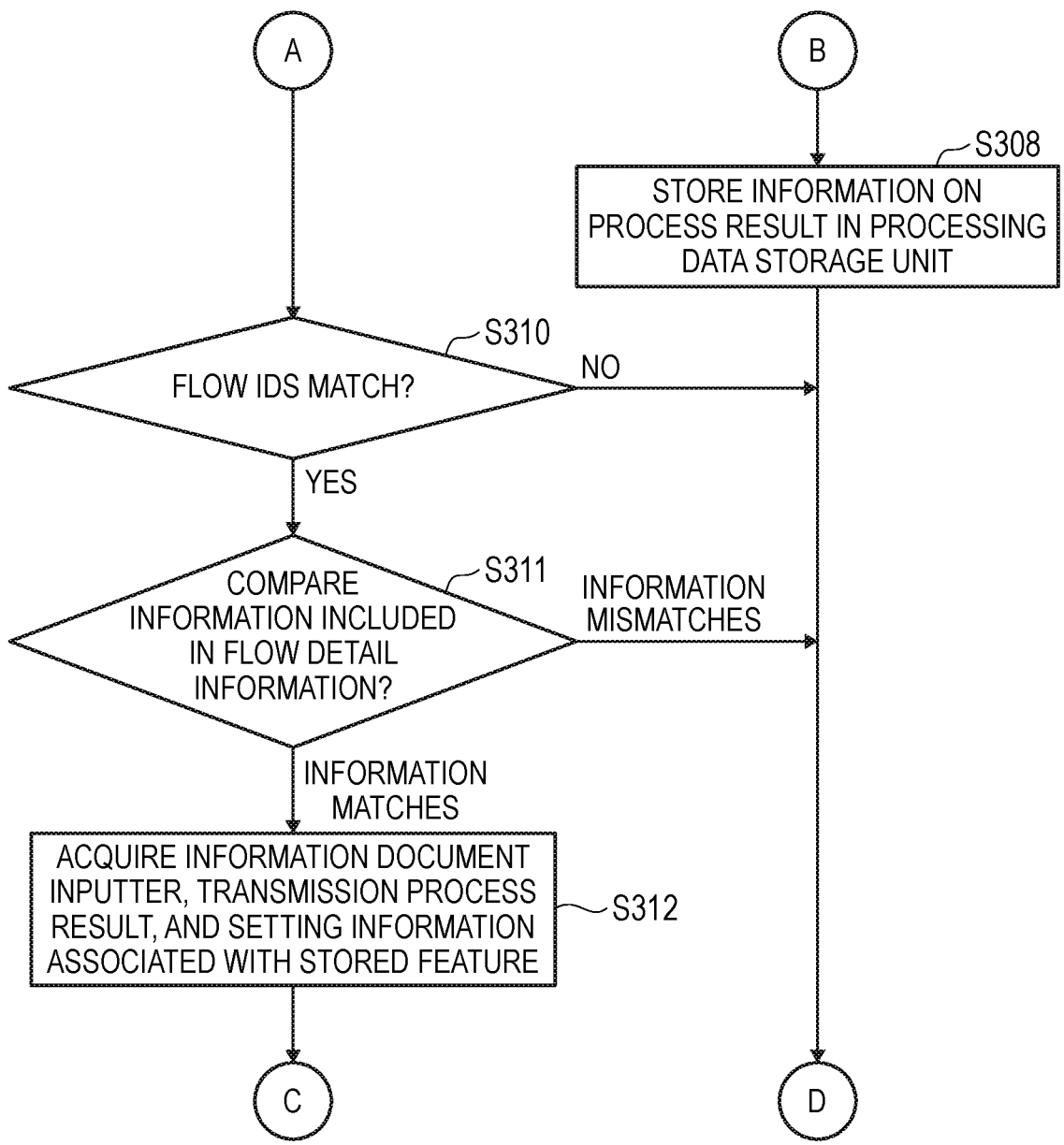
FIG. 13 is a diagram illustrating a flow of a series of processes executed when a document is input to the information processing system.
Figure 14:
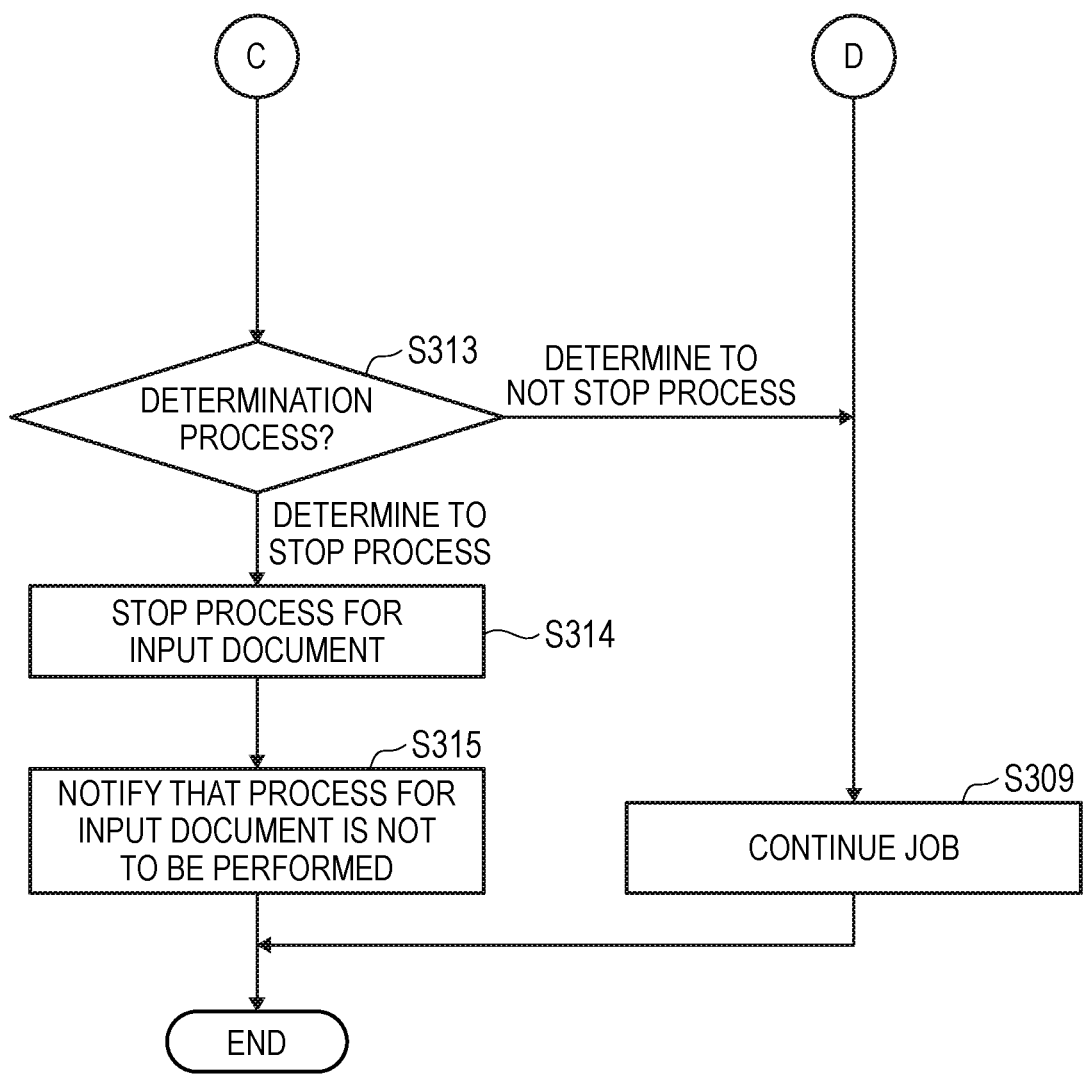
FIG. 14 is a diagram illustrating a flow of a series of processes executed when a document is input to the information processing system.

FIGS. 12 to 14 are diagrams illustrating a flow of a series of processes executed when a document is input to the information processing system 1 according to the present exemplary embodiment.

In the present exemplary embodiment, when the document (hereinafter, referred to as an "input document") is input to the information processing system 1, first, a feature of the input document is acquired (step S301).

Next, it is determined whether the acquired feature is stored in the processing data storage unit 31 (step S302).

If it is not determined in step S302 that the flow ID is stored, the flow ID of the flow used for processing the input document is acquired (step S303), and the flow detail information associated with the flow ID is acquired from the flow DB 25.

Further, information on the flow administrator included in the flow detail information is acquired from the flow detail information. In the present exemplary embodiment, the information on the flow administrator is included in the flow detail information, and the information on the flow administrator is acquired from the flow detail information.

In addition, the acquired flow ID, flow detail information, and information on the flow administrator are stored in the processing data storage unit 31 in association with the feature of the input document (step S304).

In addition, information on the document inputter, that is, information on the inputter of the input document, is acquired. Then, the information on the document inputter is also stored in the processing data storage unit 31 in association with the feature of the input document (step S304).

Next, it is determined whether the flow ID acquired in step S303 is stored in the setting information storage unit 33 (step S305).

When the setting information is stored, the setting information based on the inputter setting and the determination criterion setting stored in the setting information storage unit 33 in association with the flow ID is acquired. Then, the setting information is stored in the processing data storage unit 31 in association with the feature of the input document (step S306).

On the other hand, if the flow ID acquired in step S303 is not stored in the setting information storage unit 33, the process proceeds to step S307.

In the process of step S307, the default setting information set in advance for each of the inputter setting and the determination criterion setting is stored in the processing data storage unit 31 in association with the feature of the document.

In the present exemplary embodiment, the default setting information is stored in the setting information storage unit 33 in advance.

The default setting information is "do not include document in determination condition" and "do not include result of transmission process in determination condition". These two pieces of setting information are stored in the processing data storage unit 31 in association with the feature of the document.

More specifically, the two pieces of default setting information are stored in the column denoted by the reference numeral 3A in FIG. 3.

Next, in the present exemplary embodiment, when the process on the input document by the plug-ins 50 is completed, the information on the result of the process is stored in the processing data storage unit 31 in association with the feature of the input document (step S308).

Specifically, the information on the result of the transmission process is stored in the reference numeral 3G of the processing data storage unit 31 (see FIG. 3). More specifically, in the present exemplary embodiment, information on success or failure of transmission is stored for each transmission destination.

Thereafter, in the present exemplary embodiment, the process proceeds to step S309, and if a further job is present, the process is performed.

On the other hand, when it is determined in step S302 that the acquired feature is stored in the processing data storage unit 31, the process proceeds to step S310.

In the process of step S310, it is determined whether the flow ID of the flow used for processing the input document whose feature is acquired matches the flow IDs associated with the features stored in the processing data storage unit 31 (hereinafter referred to as the "stored features").

When it is determined in step S310 that the flow IDs do not match each other, the process proceeds to step S309. In this case, the process for the input document is continuously performed without being stopped.

When it is determined in step S310 that the flow IDs match each other, the process proceeds to step S311.

In the process of step S311, the information included in the flow detail information is compared.

Specifically, in the present exemplary embodiment, for example, it is determined whether the pieces of information set for the transmission plug-in 53 among the pieces of information included in the flow detail information match each other.

When it is determined that the pieces of set information do not match each other, the process proceeds to step S309. In this case, the process for the input document is continuously performed without being stopped.

On the other hand, when it is determined in step S311 that the pieces of set information match each other, the information on the document inputter associated with the stored feature and the information on the transmission process result associated with the stored feature stored in the processing data storage unit 31 are acquired (step S312).

Further, the setting information associated with the stored feature stored in the processing data storage unit 31 is acquired (step S312).

Then, in step S313, a determination process is performed based on these pieces of information.

In the present exemplary embodiment, as described above, the setting information on the inputter setting and the setting information on the determination criterion setting are acquired as the setting information associated with the stored feature stored in the processing data storage unit 31.

Specifically, information as to whether the setting information on the setting of the inputter is set to the "setting in which the document inputter of the document is included in the determination condition" and the "setting in which the document inputter of the document is not included in the determination condition" is acquired.

In addition, information as to whether the setting information for the determination criterion setting is set to "at least one distribution destination succeeded", "all distribution destinations succeeded", or "do not include in determination condition" is acquired.

In step S313, determination process including such setting information is performed.

Specifically, for example, in a case where the setting information on the inputter setting is set to "do not include document inputter of document in determination condition", the determination is performed based on only the transmission process result associated with the stored feature in step S313.

When the determination is made based on only the transmission process result associated with the stored feature, it is determined whether the setting is "at least one distribution destination succeeded", "all succeeded", or "do not include in determination condition".

Then, for example, when the setting is "do not include in determination condition", the process proceeds to the process of step S314, and the process for the input document is stopped.

In a case where the setting is "at least one distribution destination succeeded", it is determined whether the transmission process result associated with the stored feature corresponds to succeeded or not succeeded based on the setting.

In other words, in the case where the setting is "at least one distribution destination succeeded", it is determined whether the transmission process result associated with the stored feature is a result indicating that the transmission process of the information has been normally ended based on the setting.

Specifically, in a case where at least one among one or more transmission process results included in the transmission process result associated with the stored feature is a result of successful transmission, it is determined that the transmission process result corresponds to success.

In this case, the process proceeds to the process of step S314, and the process for the input document is stopped.

In this case, in the information transmission process executed in the process of the past document whose stored feature is obtained, the transmission of the information to at least a part of the transmission destinations succeeded.

In this case, it is determined that the transmission process of the information has been normally ended, and the process performed on the input document is not to be performed.

Further, when the setting is "at least one distribution destination succeeded", in a case where all of the one or more transmission process results included in the transmission process result associated with the stored feature are results of failure, it is determined that the transmission process result corresponds to failure.

In this case, the process proceeds to the process of step S309, and the process for the input document is continued without being stopped.

In this case, in the information transmission process executed in the process of the past document whose stored feature is obtained, the transmission of the information to all of the transmission destinations failed.

In this case, it is determined that the transmission process of the information has not been normally ended, and the process performed on the input document is to be performed.

In a case where the setting is "all succeeded", it is determined whether the transmission process result associated with the stored feature corresponds to succeeded or not succeeded based on the setting.

Specifically, in a case where all of the one or more transmission process results included in the transmission process result associated with the stored feature are results of successful transmission, it is determined that the transmission process result corresponds to success.

In this case, the process proceeds to the process of step S314, and the process for the input document is stopped.

In this case, in the information transmission process executed in the process of the past document whose stored feature is obtained, the transmission of the information to all of the transmission destinations succeeded.

In this case, it is determined that the transmission process of the information has been normally ended, and the process performed on the input document is not to be performed.

Further, when the setting is "all succeeded", in a case where at least one among the one or more transmission process results included in the transmission process result associated with the stored feature is a result of failure, it is determined that the transmission process result corresponds to failure.

In this case, the process proceeds to the process of step S309, and the process for the input document is continued without being stopped.

In this case, in the information transmission process executed in the process of the past document whose stored feature is obtained, the transmission of the information to one or more among the transmission destinations did not succeed.

In this case, it is determined that the transmission process of the information has not been normally ended, and the process performed on the input document is to be performed.

On the other hand, in a case where the setting information on the inputter setting is set to including the document inputter of the document in the determination condition, it is determined whether the document inputter associated with the stored feature matches the document inputter who input the input document.

In a case where the document inputter associated with the stored feature does not match the document inputter who input the input document, the process proceeds to the process of step S309, and the process for the input document is continuously performed without being stopped.

Further, in the case where the setting is including the document inputter of the document in the determination condition, when the document inputter associated with the stored feature matches the document inputter who input the input document, the determination is performed based on the transmission process result associated with the stored feature.

When the determination is made based on only the transmission process result associated with the stored feature, similarly as described above, it is determined whether the setting is "at least one distribution destination succeeded", "all succeeded", or "do not include in determination condition".

Then, depending on whether the setting information for the determination criterion setting is set to "at least one distribution destination succeeded", "all distribution destinations succeeded", or "do not include in determination condition", a process according to the setting is performed. This process according to the setting is as described above, and the description thereof is omitted here.

When the process proceeds to step S314 and the process for the input document is stopped, the process of step S315 is performed next.

In the process of step S315, a notification indicating that the process for the input document is not to be performed is issued to the document inputter of the input document and the flow administrator.

In addition, the document inputter associated with the stored feature may also be notified that the process for the document is not to be performed. In other words, the document inputter of the past document may also be notified that the process for the document is not to be performed.

Although not illustrated in FIGS. 12 to 14, when the process for the input document is stopped, the screen illustrated in FIG. 8 is displayed on the device 40 of the document inputter of the input document.

Then, when the document inputter selects the first continuation button 61 or the second continuation button 62 on the screen, the process on the input document is resumed.

In the present exemplary embodiment, the process to be performed on the input document is performed if a predetermined specific condition is satisfied, such as being permitted by the user, even in a case where it is decided to not perform the process to be performed on the target document.

Here, as described above, when the first continuation button 61 is selected by the document inputter, the information is transmitted to all the transmission destinations including the transmission destinations to which transmission of information succeeded in the process in the past document.

When the second continuation button 62 is selected by the document inputter, the transmission destinations to which the transmission of the information succeeded in the process in the past document are excluded, and the information is transmitted to the transmission destinations to which the transmission of the information was not normally performed in the process in the past document.

(Others)

The above has described a case where the process is continued when the specific condition is satisfied even when the flow IDs match each other. However, the present disclosure is not limited thereto, and the decision may be made such that the process is not to be performed when the IDs match each other without considering the specific condition.

Further, the above has described plural conditions as the specific condition such as match/mismatch of the document inputter, the transmission process succeeded/not succeeded, and match/mismatch of the transmission plug-in are described, but these conditions are not all essential, and any condition may be used alone.

Further, the decision may be performed such that the process is not to be performed when the flow IDs match each other as described above, without using these conditions at all.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

REFERENCE SIGNS LIST

1 information processing system
11 job processing unit
13 document feature extraction unit
15 flow management unit
17 user management unit
19 processing data storage processing unit
21 multi-feed detection unit
31 processing data storage unit
33 setting information storage unit
40 device
50 plug-in

What is claimed is:

1. An information processing system comprising a processor, wherein the processor is configured to:
   acquire a feature amount of a target document that is a document as a processing target;
   acquire process information that is information on a process to be performed on the target document;
   acquire past information that is information on a process performed on a past document that has a feature amount whose difference from the feature amount of the target document falls within a predetermined threshold range and has been processed in the past; and
   determine whether to perform the process to be performed on the target document based on the process information and the past information, wherein
   the processor is configured to decide to not perform the process to be performed on the target document when the process to be performed on the target document is same as the process which is performed on the past document and normally ended without error.

2. The information processing system according to claim 1, wherein
   the process to be performed on the target document and the process performed on the past document are processes obtained by combining a plurality of processes.

3. The information processing system according to claim 1, wherein
   the processor is configured to:
      decide to perform the process to be performed on the target document in a case where a person who input the target document to the information processing system is different from a person who input the past document to the information processing system, even when the process performed on the past document is to be performed on the target document.

4. The information processing system according to claim 1, wherein
   the processor is configured to:
      decide to perform the process to be performed on the target document in a case where at least a part included in the process performed on the past document has not been normally ended, even when the process performed on the past document is to be performed on the target document.

5. The information processing system according to claim 4, wherein
   the processor is configured to:
      decide to perform the process to be performed on the target document in a case where a transmission process of information included in the process performed on the past document has not been normally ended.

6. The information processing system according to claim 5, wherein
   the processor is configured to:
      determine that the transmission process of the information has been normally ended and decide to not perform the process to be performed on the target document if transmission of information to at least a part of transmission destinations included in transmission destinations to which the information is to be transmitted by the transmission process of the information included in the process performed on the past document succeeded.

7. The information processing system according to claim 5, wherein
   the processor is configured to:
      determine that the transmission process of the information has not been normally ended and decide to perform the process to be performed on the target document if transmission of information to all transmission destinations included in transmission destinations to which the information is to be transmitted by the transmission process of the information included in the process performed on the past document has not succeeded.

8. The information processing system according to claim 1, wherein
   the processor is configured to:
      decide to perform the process to be performed on the target document when permitted by a user even in a case of deciding to not perform the process to be performed on the target document.

9. The information processing system according to claim 1, wherein
   the processor is configured to:

perform decision on the process to be performed on the target document based on identification information associated with the process to be performed on the target document and identification information associated with the process performed on the past document.

10. The information processing system according to claim 9, wherein
the processor is configured to:
decide to perform the process to be performed on the target document when the identification information associated with the process to be performed on the target document is different from the identification information associated with the process performed on the past document.

11. The information processing system according to claim 9, wherein
the processor is configured to:
decide to not perform the process to be performed on the target document when the identification information associated with the process to be performed on the target document matches the identification information associated with the process performed on the past document.

12. The information processing system according to claim 11, wherein
the processor is configured to:
decide to perform the process to be performed on the target document if a predetermined condition is satisfied, even when the identification information associated with the process to be performed on the target document matches the identification information associated with the process performed on the past document.

13. The information processing system according to claim 12, wherein
the processor is configured to:
decide to perform the process to be performed on the target document if a setting made on the process to be performed on the target document is different from a setting made on the process performed on the past document, even when the identification information associated with the process to be performed on the target document matches the identification information associated with the process performed on the past document.

14. The information processing system according to claim 13, wherein
the processor is configured to:
decide to perform the process to be performed on the target document if a setting related to transmission process of information included in the process to be performed on the target document is different from a setting related to transmission process of information included in the process performed on the past document.

15. The information processing system according to claim 12, wherein
the processor is configured to:
decide to perform the process to be performed on the target document if a plug-in used in transmission process of information included in the process to be performed on the target document is different from a plug-in used in transmission process of information included in the process performed on the past document, even when the identification information associated with the process to be performed on the target document matches the identification information associated with the process performed on the past document.

16. The information processing system according to claim 12, wherein
the processor is configured to:
decide to perform the process to be performed on the target document when a person to input the target document is different from a person inputting the past document, even when the identification information associated with the process to be performed on the target document matches the identification information associated with the process performed on the past document.

17. The information processing system according to claim 12, wherein
the processor is configured to:
decide to perform the process to be performed on the target document in a case where at least a part included in the process performed on the past document has not been normally ended, even when the identification information associated with the process to be performed on the target document matches the identification information associated with the process performed on the past document.

18. An information processing method comprising:
acquiring a feature amount of a target document that is a document as a processing target;
acquiring process information that is information on a process to be performed on the target document;
acquiring past information that is information on a process performed on a past document that has a feature amount whose difference from the feature amount of the target document falls within a predetermined threshold range and has been processed in the past; and
determine whether to perform the process to be performed on the target document based on the process information and the past information, wherein
in the determining, it is decided to not perform the process to be performed on the target document when the process to be performed on the target document is same as the process which is performed on the past document and normally ended without error.

19. A non-transitory computer readable medium storing a program causing a computer to execute a process for information processing, the process comprising:
acquiring a feature amount of a target document that is a document as a processing target;
acquiring process information that is information on a process to be performed on the target document;
acquiring past information that is information on a process performed on a past document that has a feature amount whose difference from the feature amount of the target document falls within a predetermined threshold range and has been processed in the past; and
determine whether to perform the process to be performed on the target document based on the process information and the past information, wherein
in the determining, the computer decides to not perform the process to be performed on the target document when the process to be performed on the target document is same as the process which is performed on the past document and normally ended without error.

* * * * *